Figure 1:
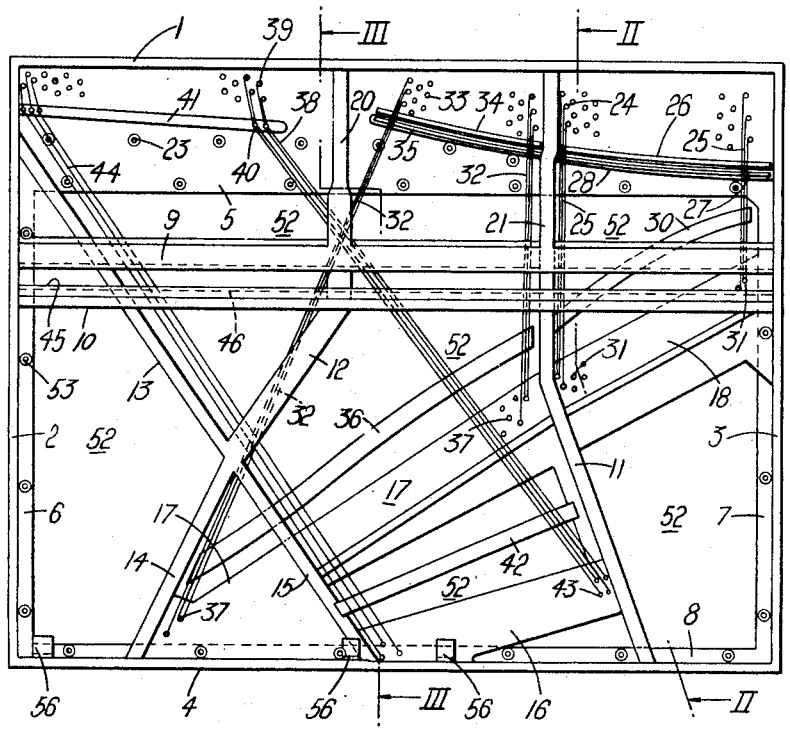

Aug. 18, 1964   J. A. SALMONS   3,144,800
PIANOFORTES

Filed June 12, 1961   2 Sheets-Sheet 1

Inventor

By

Attorney

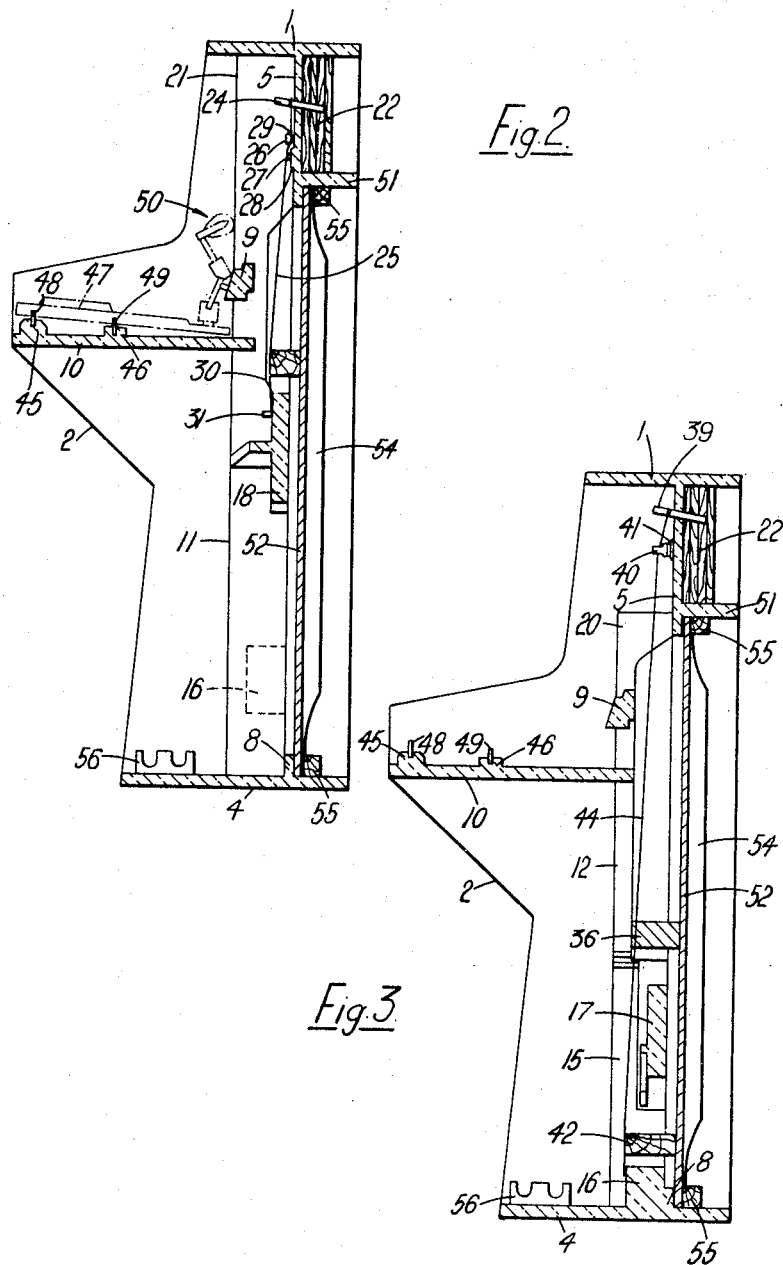

United States Patent Office 3,144,800
Patented Aug. 18, 1964

3,144,800
PIANOFORTES
John A. Salmons, Northampton, England, assignor to Crown Foundry Company Limited, Northampton, England, a British company
Filed June 12, 1961, Ser. No. 116,514
11 Claims. (Cl. 84—186)

This invention relates to pianofortes which normally comprise two main structural components, namely a frame and a case. The frame must be strong enough to withstand the very considerable tensile forces exerted by the strings of the instrument and is invariably made of cast iron. The case merely encloses the frame and the other working components while providing the necessary degree of resonance for the proper operation of the instrument, and is normally made of wood.

According to the present invention the frame and the top, bottom and sides of the case comprise a single unitary moulding of reinforced plastic. It is found that a frame made of reinforced plastic when stiffened by the inclusion of these parts of the case is capable of resisting the tensile forces exerted by the strings.

The key bottom is also preferably included as part of the same moulding in order to increase the overall rigidity and in addition one or more bracing struts may be moulded integrally with the frame.

A pianoforte according to the invention will now be described in more detail by way of example with reference to the accompanying drawings in which:—

FIGURE 1 is a front elevation view with parts removed for clarity;
FIGURE 2 is a cross-sectional view on the line II—II of FIGURE 1, and
FIGURE 3 is a cross-sectional view on the line III—III of FIGURE 1.

As is shown in FIGURE 1 the casing is made up of a top 1, two sides 2 and 3 and a bottom 4. The frame includes a plank area 5 extending the length of the piano, two side members 6 and 7, and a bottom 8. Extending between the side parts 6 and 7 is an action beam 9 and a key bottom 10. A strut 11 extends between the key bottom and the bottom 8 of the frame, while a further strut 12 extends from the key bottom to a junction with another strut 13 running from the plank area 5. From the junction of these two struts two further struts 14 and 15 extend to the bottom 8 of the frame. A bass hitch pin table 16 extends between the struts 11 and 15 and a tenor hitch pin table 17 extends between struts 11 and 14 and the bottom 8 of the frame. A treble hitch pin table 18 extends between the strut 11 and the sides 7 and 3 of the frame and the casing. A pair of vertical struts 20 and 21 extend between the top of the key bottom and the top 1 of the casing.

All the components described so far constitute the major part of the casing and frame of the piano, and all are formed as an integral moulding in the reinforced plastic material. To manufacture this unit the required amount of glass cloth is tailored and laid in the mould. Resin is then injected into the mould under pressure and after the cloth is fully impregnated the material is left in the mould, or removed from the mould and left, until the resin is cured. Alternatively the cloth may be impregnated by applying a vacuum to it so that the resin is sucked in. In fact, any of the conventional industrial plastic moulding methods may be used. The resin used may be an epoxy resin, a phenolic resin or polyesters may be used. In general a number of different resins may be suitable, the main requirement being that the one used must be stable.

The remaining components of the piano are fitted to this moulded frame and arranged as shown in the drawings. Placed behind the plank area 5 is a wrest plank 22 made up of four laminated pieces of beech. If required more pieces can be used. The wrest plank is held to the plank area by a number of screws such as 25 which pass through sockets formed in the plank area during the moulding process. The plank area is also formed with a number of holes through each of which passes a wrest pin 24. The pin also penetrates the wrest plank 22 and, as is seen from FIGURE 2 each pin is angled upwards so that it will not pull out of the plank under the tension of the strings. Each pin may be rotated in the plank in order to change the tension of the respective string and thus tune the piano.

At the treble end of the piano the strings 25 pass from the respective wrest pin under a pressure bar 26, and over a gutter wire 27, supported on a raised portion 28 of the plank area 5. Screws 29 are provided for fixing the pressure bar to the plank area. From the gutter wire the strings extend down the piano over a sound board bridge 30 and are fixed at their other ends to pins 31 fixed to the treble hitch pin table 18. The sound board bridge 30 is made of beech and is fixed to the sound board 52. Trichords 32 forming the tenor section of the stringing are fixed at their upper ends to wrest pins 33 and, similarly to the treble strings, pass under a pressure bar 34, over a gutter wire 35, over a tenor sound board bridge 36, and are fixed to pins 37 in the tenor hitch pin table 17. The pressure bar and gutter wire are fixed similarly to those for the treble section and the sound board bridge 36 is carried on the sound board 52. On each of these sections the speaking length of each string is the length of the string extending between the gutter wire and the sound board bridge. Bass bichords 38 extend from wrest pins 39 through studs 40 fixed to a stud platform 41 rasied from the plank area 5. From these studs the strings extend in front of the tenor strings and over a bass sound board bridge 42, being fixed at their other ends to pins 43 fixed to the bass hitch pin table 16. The bass sound board bridge 42 is also made of beech and is again fixed to the sound board 52. The bass covered strings 44 run similarly from the left hand side of the plank area to the left hand side of the bass hitch pin table.

The key bottom 10 has two ridges 45 and 46 running along its length and these together form what would be the key frame of an ordinary piano. Each key 47 is mounted on two pivots 48 and 49 held in the ridges 45 and 46 respectively. At the inner end of the key is carried the normal hammer mechanism, shown schematically as 50, and this mechanism is pivoted to the action beam 9. An extremely simple hammer outline wtihout the dampers and associated mechanism is shown in FIGURE 2, but it will be understood that any standard action can be used.

As shown in FIGURES 2 and 3 the sides, top and bottom of the casing extend backwards behind the frame, and the sides 6 and 7, and the bottom 8 of the frame, together with a part of the plank area projecting below a rearward extension 51 of this area, form a rectangular framework to which the usual wooden sound board 52 is fitted. The sound board is held to the moulded plastic unit by screws such as 53 passing through holes which are formed in the plastic during the moulding process. The sound board is reinforced so that it keeps its shape better by a number of wooden bars 54, extending between the lower and upper edges of the board, and making an angle of approximately 45° with the edge of the board. The sound board is further strengthened by a wood fillet 55 extending round each edge of the sound board. The fixing screws 53 are screwed into these fillets.

Fixed to the bottom of the casing are bearings 56 for the pedal gear of the piano, and these may conveniently also be formed of plastic in the same moulding operation. The remainder of the pedal mechanism is not shown but may take any of the standard forms. The lid and the upper and lower doors may be attached in the usual way and the necessary attachment points of the casing are also formed during the moulding operation. The lid and doors may also be formed of reinforced plastic and since they are not stressed at all, the materials used need not be so strong as those used for the casing and frame. For example they may be formed by placing a single layer of glass cloth in a mould of the required shape, pouring a layer of vermiculite on top of the cloth, and subsequently impregnating the whole mass with a resin.

In order to reduce cost it is also possible to make some of the less stressed parts of the plastic unit, such as the key bottom, action beam and sides, top and bottom of the case, from vermiculite. The key bottom and action beam need not form part of the integral moulding and conventional materials could be used for these.

The parts of the plastic unit which take a comparatively high stress such as, particularly, the struts 20 and 21 may need to be reinforced. Such a reinforced strut may be formed by winding a 45° helix of glass fibre on a mandrel so that alternate layers of fibre have the angle of the helix in opposite directions. The mandrel may be made of metal or of the resin treated glass cloth which the rest of the plastic unit is made from. The glass fibre reinforcing may also be impregnated with the resin and cured in situ in the mould with the remainder of the unit.

It is possible to replace the wood plank 22 by a plastic unit which is also moulded integrally with the rest of the frame and case. This unit may subsequently be drilled and fitted with high friction plastic plugs into each of which is inserted a wrest pin such as 24 or 39. The holes for the plugs, or even the plugs themselves, may be made or inserted during the moulding process, or alternatively the wrest pins could be cast in directly. The same method of drilling and force fitting the pin into the hole or a plug can also be used for the hitch pins.

The finish of the piano should be traditional and any of the resin impregnated glass cloths used is capable of being veneered so that the finished piano is acceptable to the eye.

I claim:
1. A pianoforte comprising a unitary integral moulding of reinforced plastic constituting the frame and the top, bottom and sides of the case of the pianoforte.

2. A pianoforte according to claim 1 further comprising a key bottom member, and vertical struts between the key bottom and the top of the frame.

3. A pianoforte according to claim 2 in which at least one of said struts is also included as an integral part of the moulding.

4. A pianoforte according to claim 1 further comprising a key bottom member, and struts substantially parallel with the lines of the strings extending between the key bottom and the bottom of the frame.

5. A pianoforte according to claim 4 in which at least one of said struts is also included as an integral part of the moulding.

6. A unitary integral combination frame and casing for a pianoforte comprising two spaced-apart vertical side members forming the sides of the casing, horizontal members extending between the upper ends and the lower ends, respectively, of the sides to form the top and bottom of the casing, a plank like member extending downwardly from the horizontal top member and forming the upper portion of the frame, and a continuous inwardly projecting plank-like member extending downwardly from the ends of the first-mentioned plank-like member along the side walls of the casing and across the bottom thereof to form the side and bottom portions of the frame, the entire device constituting a unitary integral moulding of reinforced plastic and each of the members forming a portion of the moulding.

7. A device as recited in claim 6 further comprising means located adjacent to the inner edges of the frame portion to facilitate mounting of a sound board over the open center of the frame portion.

8. A device according to claim 7 further comprising a key bottom member extending horizontally between the vertical sides of the casing and constituting a portion of the unitary integral moulding.

9. A device according to claim 8 further comprising a member extending horizontally between the vertical sides of the casing above the key bottom member to form the action beam of a pianoforte and constituting a portion of the unitary integral moulding.

10. A device according to claim 8 further comprising substantially vertical struts extending from the key bottom member to the upper portion of the frame, at least one of said struts constituting a portion of the unitary integral moulding.

11. A device according to claim 10 further comprising a means carried by the upper portion of the frame to facilitate the attachment of piano strings, a plurality of hitch pin tables located substantially below the key bottom member and including means to permit the attachment of the other ends of piano strings, and struts forming portions of the unitary integral moulding and extending between the key bottom and the bottom of the frame substantially parallel to the direction of the piano strings.

References Cited in the file of this patent

UNITED STATES PATENTS

| | | |
|---|---|---|
| 1,881,229 | Young | Oct. 4, 1932 |
| 1,980,483 | Hill | Nov. 13, 1934 |
| 2,474,599 | Stapely | June 28, 1949 |
| 2,505,803 | Stein | May 2, 1950 |
| 2,532,070 | Moore et al. | Nov. 28, 1950 |
| 2,600,910 | Nickel | June 17, 1952 |
| 2,858,723 | Wickham | Nov. 4, 1958 |